United States Patent [19]

Schroeder et al.

[11] Patent Number: 4,613,670
[45] Date of Patent: Sep. 23, 1986

[54] GROUP IVB METAL CONTAINING POLYDYES

[75] Inventors: Jack A. Schroeder; Charles E. Carraher, Jr., both of Fairborn, Ohio; Richard A. Schwarz, Big Spring, Tex.

[73] Assignee: Wright State University, Dayton, Ohio

[21] Appl. No.: 606,856

[22] Filed: May 3, 1984

Related U.S. Application Data

[63] Continuation of Ser. No. 377,641, May 13, 1982, abandoned, which is a continuation of Ser. No. 136,573, Apr. 1, 1980, abandoned.

[51] Int. Cl.$^4$ .............................................. C09B 11/08
[52] U.S. Cl. .................................. 549/211; 549/210; 549/3; 534/722; 548/106
[58] Field of Search ........................................ 549/211

[56] References Cited

U.S. PATENT DOCUMENTS 3,787,368  1/1974  Lander ................................. 260/67.6
3,937,851  2/1976  Bellanca et al. ..................... 426/540
4,113,505  9/1978  Bellanca et al. ..................... 106/137

OTHER PUBLICATIONS

Chemical Abstracts, vol. 78 (1973) 58846g.
E. N. Abrahart, Dyes and Their Intermediates (1968) pp. 167, 174–175, 227–228.
Chemical Abstracts, vol. 92 (1980) 140106p.
C. E. Carraher et al., Polymer, vol. 14(2) (1973) pp. 42–44, vol. 15(1) (1974) pp. 9–12.
C. E. Carraher et al., Die Angewandte Makromolekulare Chemie, vol. 39 (1974) pp. 69–76, vol. 52 (1976) pp. 111–116.
C. E. Carraher et al., J. Macromol. Sci.-Chem., A9(2) (1975) pp. 191–198.
C. E. Carraher et al., Polymer Preprints, vol. 18(2) (Aug. 1977) pp. 403–407.
C. Carraher and P. Lessek, European Polymer Journal (1972) vol. 8, pp. 1339–1345.
Charles E. Carraher, Jr. et al. Journal of Polymer Science: Part A-1 vol. 9, pp. 983–989 (1971).
Charles E. Carraher, Jr. et al., Organic Coatings and Plastics Chemistry, vol. 33, No. 1–Apr. 1973, pp. 624–628; vol. 34, No. 2, 1974, pp. 478–483, vol. 43, pp. 798–803; vol. 42, pp. 23–29.
Carraher et al., Macromol. Si-Chem. A15 (5), pp. 773–785 (1981).
Carraher et al., Div. of Organic Coatings and Plastics Chemistry, Organic Coatings and Applied Polymer Science Proceedings, vol. 47 (1982) pp. 119–123.
Carraher et al., "Advances in Organo-Metallic & Inorganic Polymer Science"-Chapter 6, pp. 195–230, 1982.

Primary Examiner—Norma S. Milestone
Attorney, Agent, or Firm—Biebel, French & Nauman

[57]  ABSTRACT

Water soluble dyestuffs having at least two reactive Lewis base sites are polymerized in a condensation reaction with group IVB metallocenes or group IVA organohalides to yield linear or crosslinked, and colored and/or fluorescent polymeric products. The polydyes are useful in providing permanent coloration of paper, plastics, textiles, paints and the like.

9 Claims, No Drawings

GROUP IVB METAL CONTAINING POLYDYES

CROSS REFERENCE TO RELATED APPLICATION

This application is a continuation of U.S. application Ser. No. 377,641, filed May 13, 1982 (abandoned), which in turn is a continuation of U.S. application Ser. No. 136,573, filed Apr. 1, 1980, abandoned.

BACKGROUND OF THE INVENTION

This invention relates to polymeric dye compositions and methods for their preparation and use.

Many different colorants are commercially available which are used to color polymeric materials, textiles, paper, paint, and the like. These colorants can be classified as either dyes or pigments. Generally, a colorant is considered to be a dye if it is soluble in the medium in which it is used or is applied by a process involving solution formation. Pigments, on the other hand, are generally water insoluble and insoluble in the medium into which they are dispersed.

Although dyes are generally stronger, brighter, and more transparent than pigments, because of their inherent solubility they possess poor migration fastness, especially in plastics. Such migration may take the form of bleeding, blooming, or plateout. Bleeding is the migration of a colorant from one substrate material to an adjacent differently colored or uncolored material as a result of the dye's solubility. Blooming results when the colorant migrates to the surface of a substrate, recrystallizes, and forms a dust-like coating which is easily rubbed off onto adjacent materials. Finally, plateout is characterized by the buildup of a colorant on the metallic surfaces of processing equipment.

Obviously, the above problems with dyes greatly limits their use in plastics, synthetics, and other polymeric materials. Accordingly, the need exists in the art for dyes which exhibit permanence and migration fastness when used as colorants in polymers and the like.

SUMMARY OF THE INVENTION

The present invention meets that need by providing polymeric dye compositions which can be incorporated into a number of other polymeric materials including thermoplastics, paints, textiles, paper, and the like. The polymeric dyes are produced by condensing a monomeric dye component with a group IVB metallocene moiety either in an aqueous solution of the two or at or near the interface of an aqueous phase containing the dye component and an immiscible organic phase containing the metallocene. Polymeric dyes may also be produced by condensing the monomeric dye component with a group IVA organohalide moiety at or near the interface of an aqueous phase containing the dye component and an immsiscible organic phase containing the organohalide.

The group IVB metallocenes used in the practice of the present invention have the general structure $Cp_2MX_2$, where Cp is the cyclopentadienyl moiety, M is a group IVB metal selected from the group consisting of titanium, zirconium, and hafnium, and X is a halogen such as chloride. The group IVB metallocene dichlorides are readily available and remain stable in organic solutions for times well in excess of the time required for the condensation reaction to occur. In aqueous solutions, these metallocenes form species which behave chemically as a $Cp_2M^{+2}$ moiety. Since these compounds contain metals which have been used as catalysts, the metal can act as a catalyst in the polymeric dye composition as well. These metallocene compounds also have the ability to act as sinks for ultraviolet light. That is, they absorb and safely disperse ultraviolet energy to prevent degradation of the polymer.

The group IVA organohalides have the general structure $RR'MX_2$, where R and R' can be a liphatic or aromatic hydrocarbon groups and can be the same or different, M is a group IVA metal selected from the group consisting of tin, germanium, and silicon, and X is a halogen such as chloride. Many compounds of this type are readily available and remain stable in organic solutions for times well in excess of the time required for the condensation reaction to occur. In particular, compounds of this type containing tin exhibit biological activity in retarding or eliminating the growth of certain bacteria and fungi.

Dyes useful in the practice of the present invention include water soluble dyes having at least two reactive Lewis base sites. The at least two reactive sites provide the electron pair donor sites for the metal of the metallocene moiety to condense with providing linear reaction products.

Among the preferred dyes useful in the present invention are xanthene dyes having the following structure:

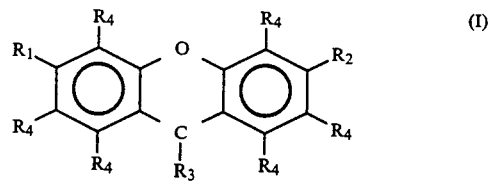

where $R_1$ and $R_2$ are hydroxide, amino, —COOH, or —$SO_3H$, $R_3$ is hydrogen, alkyl or aryl and may themselves contain a Lewis base site, and $R_4$ is hydrogen, bromine, chlorine, fluorine, iodine, alkyl, or aryl and where the $R_4$ groups can be the same or different from one another.

Other dyes useful in the present invention include phenolsulfonphthalein dyes having the following structure:

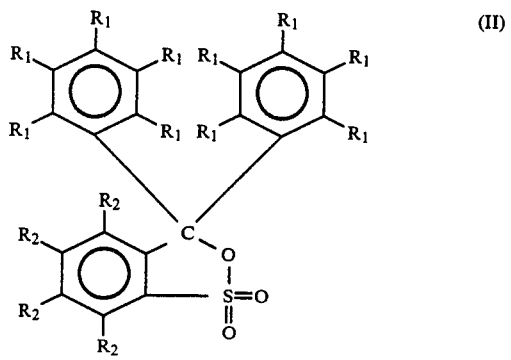

where $R_1$ is hydrogen, halogen, hydroxide, alkyl, or aryl and can be the same as or different from one another and $R_2$ is halogen or hydrogen and again can be the same as or different from one another.

The polymeric dyes exhibit excellent migration fastness and permanence when used to color paper, textiles, various polymers including polyethylene, polypropylene, nylon, polyvinyl chloride, and polystyrene, and paints. Many of the dyes produced by the practice of the present invention also exhibit fluorescent properties when exposed to ultraviolet light. Other utilities for these polydyes include use in variable frequency laser systems, as ultraviolet and visible spectroscopy standards, as specialty biological stains, and as catalysts, as biological (control) release agents, and as biologically active agents.

Accordingly, it is an object of the present invention to provide a polymeric dye composition which exhibits both permanence and migration fastness in use. This and other objects and advantages of the invention will be apparent from the following description and the appended claims.

DESCRIPTION OF THE PREFERRED EMBODIMENTS

The polydyes of the present invention are produced by the condensation of a dye component and either a group IVB metallocene or a group IVA organohalide. As the dye component, dyes having at least two reactive Lewis base sites and which are soluble in water are suitable for use in the invention. The two reactive Lewis base sites are required to provide electron donor pair sites for the metal of the metallocene or organohalide moiety to condense with. The resulting products are linear or crosslinked if more than two active Lewis bases sites are available, having alternating metal and dye components. It has been found that the more highly nucleophilic the reaction sites, the more the yield of polydye product.

Examples of dyes suitable for use in the invention include xanthene dyes having the general formula I above, where $R_1$ and $R_2$ are hydroxide, amino, —COOH, or —SO$_3$H, $R_3$ is hydrogen, alkyl, or aryl, and $R_4$ is hydrogen, bromine, chlorine, fluorine, or iodine. Specific xanthene dyes include tetrabromofluorescein, dibromohydroxymercurifluorescein, tetraiodofluorescein, tetrabromotetrachlorofluorescein, and tetraiodotetrachlorofluorescein.

Water soluble phenolsulfonphthalein dyes having the general formula II above, where $R_1$ is hydrogen, halogen, hydroxide, or alkyl group and $R_2$ is hydrogen, halogen, alkyl, or aryl, have also been found to be suitable for use in the invention. Specific phenolsulfonphthalein dyes include tetrabromophenolsulfonphthalein and tetrabromothymolsulfonphthalein.

Of course, other water soluble dyestuffs can be utilized with the proviso that they have at least two reactive Lewis base sites. Examples of such dyes include nigrosine dyes, azo dyes such as Eriochrome Black T which has the structure.

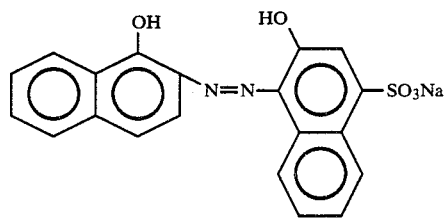

and certain indigo dyes such as Indigo Carmine which has the structure:

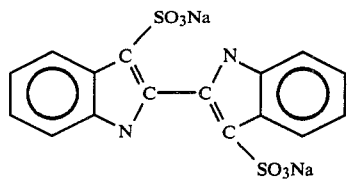

Polymerization of the Eriochrome Black T dyestuff, because of its three reactive Lewis base sites has been found to yield a polydye having various amounts of branching and crosslinking approximating the following structure:

$$(D_1-Cp_2M)_n, Cp_2M$$
$$Cp_2M$$

where, D is the dye and $Cp_2M$ is the metallocene moiety.

The metallocene moiety used in the condensation polymerization reaction has the general formula $Cp_2MX_2$, where Cp is a cyclopentyldienyl group, X is a halogen, and M is a group IVB metal selected from titanium, zirconium, and hafnium. This moiety acts as a Lewis acid in solution by accepting the electron pair donated by the reactive site of the dye to form a bond between the metal and dye.

The condensation reaction proceeds rapidly at low temperatures (approximately 25° C.) utilizing either an agitated aqueous solution or an agitated aqueous and immiscible organic phase solution. The temperature at which the reaction is carried out may vary over a wide range limited only by the freezing and boiling temperatures of the solutions utilized. The ratio of dye to metallocene in the reaction may vary over a wide range. Preferably, a dye to metallocene mole ratio of from 1:3 to 8:1 is utilized with the greatest product yields and longest chain lengths resulting from the use of an approximately 1:1 mole ratio.

In carrying out the reaction in an aqueous solution, a dye having a concentration of from 4.0 mmole to 0.4 moles per liter, and preferably from 0.3 to 1.0 mmoles per 30 ml water, is placed in an agitated vessel. A molar equivalent of a base such as sodium hydroxide is added to the solution if the acid form of the dye was utilized. Base need not be added if the salt form of the dye was utilized. The metallocene moiety, at a concentration of 0.1 to 2.0 mmoles per 30 ml water, is added to the dye solution with mixing. It has been found that simple stirring or mixing with mixing speeds of up to 18,600 rpm and above yield suitable results. Mixing is terminated upon the formation of a gel or after approximately 60 seconds if no gel forms. The polydye product is then washed and filtered. Carrying out the reaction in aqueous solution is preferred only for dyes having highly nucleophilic reaction sites (i.e., hydroxides).

In carrying out the reaction in a two phase solution, due at the same concentration as above is again dissolved in water and base and placed in an agitated vessel. The metallocene moiety or group IVA organohalide, at a concentration of 0.1 to 2.0 mmoles per 30 ml chloroform is added to the dye solution with mixing. The polymerization reaction proceeds at or rear the interfacial areas of the aqueous and immiscible organic solutions. The resultant polymer is then filtered and washed. If a zirconium of hafnium metallocene is utilized, it is preferred that it be dissolved in a 50% by volume chloroform, 50% by volume carbon tetrachloride solution. It has been found that the addition of carbon tetrachloride increases the tendency of the metallocene to enter the interfacial reaction zone, thereby encouraging the condensation reaction to occur.

The resulting polydyes have been found to have limiting viscosity numbers of from 3–238 ml/gm indicating molecular weights of from a few thousand to about 5,000,000 gm/mole. Chain lengths have been found to be from several to 5000 and above.

In order to better understand the invention, the following nonlimiting examples are presented.

EXAMPLE 1

Water soluble dyestuffs were polymerized by adding dicyclopentadienyl titanium dichloride ($Cp_2TiCl_2$) in 30 ml chloroform to a rapidly stirred (18,600 rpm) solution of the dye in 30 ml water containing added sodium hydroxide at 25° C. The results are reported in Table I below. As can be seen, the use of an aqueous solution as the reaction medium in some cases adversely affects the polymerization reaction. Likewise, failure to add base to the reaction medium also adversely affects yields if the original dye is in the nonsalty (acid) form.

TABLE I

| Dye | Reactant Conc. (mmole) Dye:Ti:Base | Reaction Time (secs) | Gel Time (secs) | Yield (%) | Limiting Viscosity Number (ml/g) |
|---|---|---|---|---|---|
| Indigo Carmine (salt) | 0.6:0.42:0.12 | 60 | | 7 | insoluble |
| Nigrosin | 0.40:0.42:0.60 | 60 | 30 | 29 | |
| Eriochrome Black T (monosalt) | 0.50:0.70:1.00[a] | 60 | | 0 | |
| Eriochrome Black T (monosalt) | 0.50:0.70:1.00 | 60 | | 48 | |
| Ethidium Bromide | 0.30:0.42:0.60[b] | 60 | | 0 | |
| Ethidium Bromide | 0.30:0.42:0.60[ab] | 60 | | 8 | |
| Bromothymol Blue | 0.50:0.70:1.00 | 60 | | 5 | |
| Bromothymol Blue | 0.50:0.70:1.00[a] | 300 | | 0 | |
| Fluorescein (salt) | 0.60:0.30:— | 27 | 18 | 31 | 23 |
| Fluorescein (salt)[d] | 0.60:0.30:— | 11 | 11 | 22 | insoluble |
| Eosin Y (salt) | 0.60:0.30:— | 17 | 17 | 45 | 11[c] |
| Eosin Y (salt)[a] | 0.60:0.30:— | 60 | | 0 | |
| Erythrosin B (salt) | 0.60:0.30:— | 25 | 25 | 94 | 3[c] |
| Eosin Y (salt) | 0.60:0.30:1.20 | 24 | 24 | 31 | 21[f] |
| Phloxine B (salt) | 0.60:0.30:— | 60 | | 5 | insoluble |
| Bengal Red B | 0.60:0.30:1.20 | 300 | | 10 | |
| Bromophenol Blue | 0.50:0.50:1.50 | 13 | 8 | 51 | 17 |

[a]Same as above except $Cp_2TiCl_2$ is in 30 ml of water.
[b]A yield of less than 1% is formed while employing triethylamine in place of sodium hydroxide.
[c]Run in DMSO at 31° C.
[d]$Cp_2TiCl_2$ in 15 ml chloroform and 15 ml carbon tetrachloride.
[e]Employing pyridine as the added base.
[f]In triethylphosphate at 31° C.

EXAMPLE 2

Tetrabromofluorescein, available from Fisher Scientific Co., Fairlawn, N.J., under the name Eosin Y was polymerized using the same reaction conditions as in Example 1. The concentration and ratio of reactants was varied to determine their effect on product yield. The results are reported in Table II below.

TABLE II

| Eosin Y (mmoles) | $Cp_2TiCl_2$ (mmoles) | Reaction Time[a] (secs) | Yield (%) | LVN (ml/g) |
|---|---|---|---|---|
| 0.10 | 0.10 | 37 | 16 | — |
| 0.30 | 0.30 | 15 | 45 | 5 |
| 0.60 | 0.60 | 11 | 37 | 13 |
| 1.00 | 1.00 | 10 | 61 | 5 |

[a]Reaction time is equal to gel time for this table.

EXAMPLE 3

Different metallocene compounds were reacted with Eosin Y to form polydyes. The reaction conditions were: 0.3 mmole $Cp_2MCl_2$ in 30 ml of a 50%—50% by volume-mixure of chloroform and carbon tetrachloride was added to a rapidly stirred (20,500 rpm) solution of 0.60 mmole Eosin Y (93%) and 30 ml water at 25° C. The results are reported in Table III below.

TABLE III

| Metal Reactant | Yield (%) | Gel Time (secs) | Color |
|---|---|---|---|
| $Cp_2TiCl_2$ | 57 | 12 | brown-purple |
| $Cp_2ZrCl_2$ | 33 | 3 | rust |
| $Cp_2HfCl_2$ | 34 | 3 | rust |

EXAMPLE 4

Polydye products derived from tetrabromo fluorescein (Eosin Y, Fisher Scientific Co., Fairlawn, N.J. tetraiodofluorescein (Erythrosin B, Fisher Scientific Co.), tetraiodotetrachlorofluorescein (Bengal Red B, indicator grade, Aldrich Chemical Co., Milwaukee, Wis.), tetrabromotetrachlorofluorescein(Phloxine B, cert. grade, Fisher Scientific Co.), fluorescein (disodium salt, tech. grade, Aldrich Chemical Co.), nigrosine (cert. grade, Matheson, Cole, and Bell, Norwood, Ohio), and tetrabromophenolsulfonphthalein (Bromophenol Blue, Fisher Scientific Co.) were tested as paper, cloth, plastic, and paint colorants. The polydyes were dissolved in dimethylsulfoxide, dimethylformamide, and hexamethylphosphoramide, respectively, to give 0.1 to 1.0% by weight solutions of polydyes in the solvents.

The polydye solutions readily impregnated paper such as Whatman #1 filter paper and #235 No-Rivl (Fort Howard Paper Co., Green Bay Wis.) commercial paper towels to give solid, fluorescent, highly colored paper. The color remained permanent for a six month test period with the exception of the polydye derived from tetrabromophenolsulfonphthalein which faded.

Cotton, denim, and 50%–50% polyester-cotton fabrics were impregnated with the polydyes. Those polydyes containing xanthene moieties were fluorescent. The fabrics become highly colored by the addition of about 0.1 mg to 1.0 mg of dye. Without washing, the coloration remained strong for a test period of six months. With washing, the coloration faded after two to three machine washings indicating a need for a fixing agent to fix the polydyes permanently to the fabric.

The polydyes were added to several plastics by gently heating about 3 grams of the plastic to above its melting point and then adding dropwise 3 to 10 drops of the 0.1 to 1.0% by weight solution of polydye. The plastics tested included polyethylene with 12% vinyl acetate (Union Carbide; Bakelite), polycarbonate (duPont; Lexan Grade 131, 112 Natural), polypropylene (Hercules; ProFax), high density polyethylene (U.S.I. Petrothene NA-144), nylon (duPont, Zytel), polyvinylchloride (B. F. Goodrich, Geon Type 102EPF5), polystyrene (Monsanto, Lustrax HH-101-2020 Crystal 300) and SAN-styrene copolymer (Monsanto, Lustran A 21-2020 Crystal Run M1527). The plastics were uniformly colored throughout by the polydyes. Good Fluorescence at a 10 ppm polydye concentration was observed in the plastics for those polydyes which exhibited fluorescence. The fluorescence and coloration remained strong over a three month test period. No bleeding or blooming was observed.

A white commercially available aqueous-based latex paint (duPont Lucite) was colored by the addition of 0.1 to 1.0 ml of the polydye solutions to 10 ml of paint. Good coloration was achieved at this 10 to 500 ppm concentration of polydye product. The colored paint was then applied to wood and Teflon coated surfaces. The wood-applied paints dried to give a typical colored latex coated surface. The dried coatings removed from the Teflon coated surface were flexible, coherent films. All colors were bright and uniformly colored throughout the sample.

EXAMPLE 5

A polydye was produced by the reaction of a group IVA organohalide and a water soluble dyestuff. Using an interfacial reaction system, 0.3 mmoles of diphenyltin dichloride (Ventron, Alfa Inorganics Beverly, Mass.) in 30 ml of chloroform was added to a rapidly stirred (20,500 rpm, no load) solution of 0.6 mmole Eosin Y(93%) in 30 ml of water at 25° C. A red polydye precipitate formed with a yield of 33% (0.1003 gm).

While the processes and compositions herein described constitute preferred embodiments of the invention, it is to be understood that the invention is not limited to these precise processes and compositions, and that changes may be made therein without departing from the scope of the invention.

What is claimed is:

1. A polymeric dye composition having the structure (D-Cp$_2$M)$_n$, wherein D is the Lewis base of a water soluble salt of a fluorescein dyestuff selected from the group consisting of fluorescein, tetrabromofluorescein, tetraiodofluorescein, tetrachlorotetraiodofluorescein, and tetrabromotetrachlorofluorescein; wherein Cp$_2$M is a metallocene moiety in which M is a Group IVB metal, Cp is a cyclopentadienyl moiety and n is an integer greater than 1; said polymeric dye having a limiting viscosity number of from 3 to 238 ml/gm.

2. The composition of claim 1 wherein M is titanium.

3. A process for preparing a polydye comprising the steps of adding a Group IVB metallocene compound which is dissolved in an organic solution immiscible with water to an aqueous solution of the Lewis Base of a water soluble salt of a fluorescein dyestuff selected from the group consisting of fluorescein, tetrabromofluorescein, tetraiodofluorescein, tetrachlorotetraiodofluorescein, and tetrabromotetrachlorofluorescein; agitating the mixture; and recovering the resulting linear condensation reaction product; wherein the polymerization reaction takes place at the interface between the organic and aqueous phases, said polydye having a limiting viscosity number of from 3 to 238 ml/gm.

4. The process of claim 3 in which said group IVB metallocene compound is dicyclopentadienyl titanium dichloride.

5. The process of claim 3 in which said organic solution is selected from the group consisting of chloroform and a 50%—50% by volume mixture of chloroform and carbon tetrachloride.

6. The process of claim 3 in which said group IVB metallocene compound has the formula Cp$_2$MX$_2$, where Cp is a cyclopentadienyl group, X is a halogen, and M is a metal selected from the group consisting of titanium, zirconium, and hafnium.

7. The process of claim 3 in which the mole ratio of group IVB metallocene to water soluble dyestuff is from 3:1 to 1:8.

8. The process of claim 3 in which from 4.0 mmole to 0.4 moles of water soluble dyestuff per liter water is present in the aqueous solution.

9. The process of claim 3 in which from 0.1 to 2.0 mmoles of group IVB metallocene per 30 ml of solution is present in the reaction mixture.

* * * * *